(12) United States Patent
Glaser et al.

(10) Patent No.: US 11,687,110 B2
(45) Date of Patent: Jun. 27, 2023

(54) MULTI-CHANNEL PULSE CURRENT GENERATOR WITH CHARGING

(71) Applicant: Efficient Power Conversion Corporation, El Segundo, CA (US)

(72) Inventors: John S. Glaser, Niskayuna, NY (US); Stephen L. Colino, Bear, DE (US)

(73) Assignee: Efficient Power Conversion Corporation, El Segundo, CA (US)

( * ) Notice: Subject to any disclaimer, the term of this patent is extended or adjusted under 35 U.S.C. 154(b) by 606 days.

(21) Appl. No.: 16/580,028

(22) Filed: Sep. 24, 2019

(65) Prior Publication Data

US 2020/0099244 A1 Mar. 26, 2020

Related U.S. Application Data

(60) Provisional application No. 62/863,523, filed on Jun. 19, 2019, provisional application No. 62/736,830, filed on Sep. 26, 2018.

(51) Int. Cl.
*G05F 3/24* (2006.01)
*H02J 7/34* (2006.01)
*H02J 7/00* (2006.01)

(52) U.S. Cl.
CPC .......... *G05F 3/24* (2013.01); *H02J 7/00718* (2020.01); *H02J 7/345* (2013.01)

(58) Field of Classification Search
CPC ................. H02J 7/345; G05F 3/24
USPC ......................................... 320/166
See application file for complete search history.

(56) References Cited

U.S. PATENT DOCUMENTS

| | | | |
|---|---|---|---|
| 3,648,073 A | 3/1972 | Sams et al. | |
| 5,610,502 A | 3/1997 | Tallant et al. | |
| 6,433,720 B1 * | 8/2002 | Libove | H03K 17/04106 341/144 |
| 8,456,867 B1 * | 6/2013 | Karlsson | H02M 3/3378 363/17 |
| 10,439,600 B1 * | 10/2019 | Eggermont | H03K 3/356095 |
| 2003/0095406 A1 * | 5/2003 | Lebens | H05B 45/12 348/E5.038 |

(Continued)

FOREIGN PATENT DOCUMENTS

| DE | 10 2016 116 875 A1 | 3/2017 |
|---|---|---|
| DE | 10 2016 116 369 A1 | 3/2018 |

(Continued)

*Primary Examiner* — Jerry D Robbins
(74) *Attorney, Agent, or Firm* — Blank Rome LLP

(57) ABSTRACT

A multi-channel current pulse generator for driving a plurality of loads with unique positive terminals and a shared negative terminal. The pulse generator comprises a pulse control transistor and, for each load, a load capacitor and a charging control transistor. The pulse control transistor allows or blocks current pulses through the loads and has a drain terminal connected to the shared negative terminal, a source terminal connected to ground, and a gate terminal for receiving a load driver control signal. The load capacitors are discharged by current pulses through the corresponding loads. The charging control transistors allow or block charging currents for the corresponding load capacitors. The pulse control transistor is preferably an enhancement mode GaN FET and is chosen to withstand current pulses through a maximum number of loads to be driven simultaneously.

17 Claims, 7 Drawing Sheets

(56) References Cited

U.S. PATENT DOCUMENTS

| | | | |
|---|---|---|---|
| 2007/0090693 A1* | 4/2007 | Fox | H02M 1/14 |
| | | | 307/11 |
| 2009/0230883 A1 | 9/2009 | Haug | |
| 2010/0225622 A1 | 9/2010 | Wang et al. | |
| 2011/0018452 A1 | 1/2011 | Takeuchi | |
| 2012/0098599 A1 | 4/2012 | Chang et al. | |
| 2016/0344156 A1* | 11/2016 | Rothberg | C12Q 1/6869 |
| 2017/0005574 A1* | 1/2017 | Wyland | H02M 3/156 |
| 2017/0085057 A1 | 3/2017 | Barnes et al. | |
| 2017/0346475 A1* | 11/2017 | de Rooij | H03K 19/018507 |
| 2018/0196129 A1* | 7/2018 | Peng | A61B 8/5207 |

FOREIGN PATENT DOCUMENTS

| | | | | |
|---|---|---|---|---|
| JP | H05174987 A | * | 7/1993 | |
| KR | 101441378 B1 | * | 11/2008 | G02F 1/133 |
| KR | 101441378 B1 | * | 9/2014 | |

* cited by examiner

MULTI-CHANNEL PULSE CURRENT GENERATOR WITH CHARGING

This application claims the benefit of U.S. Provisional Application No. 62/736,830, filed on Sep. 26, 2018, and U.S. Provisional Application No. 62/863,523, filed on Jun. 19, 2019, the entire disclosures of which are hereby incorporated by reference.

BACKGROUND

1. Field of the Invention

The present invention relates generally to multi-channel current pulse generators, and more particularly to a multi-channel current pulse generator for driving loads which have a common terminal.

2. Description of the Related Art

Typical multi-channel current pulse generators for driving loads with a common terminal use n-type FETs to precisely control the turn-on and turn-off times and to withstand high currents. The n-type FETs are generally preferred due to the normally higher mobility of electrons compared to holds and the resulting better electrical performance of n-type FETs as measured using common figures-of-merit. Some implementations of multi-channel current pulse generators must meet particular size and pulse frequency constraints. For example, in a light detection and ranging (lidar) system, multiple laser diodes are integrated on a single substrate and share a common cathode, which allows the laser diodes to be placed closer together and precisely aligned during fabrication, simplifying alignment of optical components such as lenses and reducing overall system size.

Sharing a common cathode but having individual anodes allows the laser diodes to be controlled individually, enabling the lidar system to operate all the laser diodes together (effecting a single more powerful laser), each laser diode individually, or a combination of some but not all the laser diodes at a time. When the multi-channel current pulse generator must be able to control each load individually, however, the individual n-type FETs must be placed in series with each of the loads, and floating gate drivers must be implemented to drive the n-type FETs and ensure that the gate voltages increase in response to voltage increases at the source terminals to keep the n-type FETs turned on.

FIG. 1 illustrates a schematic of a conventional multi-channel current pulse generator for driving loads with a common terminal. In FIG. 1, conventional multi-channel pulse generator 100 includes a unique pulse generator 120 for each load 195 in the set of loads 190. The set of loads 190 share a common terminal at ground 110. In this example, the set of loads 190 includes four loads, 195A-D, although any appropriate number of loads may be used. Each load 195 is depicted as a laser diode, but any appropriate load may be used. Pulse generators 120A-D are substantially the same, but pulse generators 120B-D are shown in simplified block diagram form for ease of illustration.

The pulse generator 120A for load 195A includes a variable level shifter 125, a voltage source 130, a gate driver 135, a control transistor 140, a resistor 145, and a capacitor 150. Resistor 145 is used to charge capacitor 150, which stores energy from which the current pulse for load 195A is drawn through control transistor 140. Variable level shifter 125 receives the load driver control signal CTL 105 and increases the voltage or lowers the effective impedance of CTL 105 appropriately, providing the signal with increased voltage or current to the gate driver 135.

Gate driver 135 provides a gate driving voltage to the gate terminal of control transistor 140 based on the signal from variable level shifter 125. Gate driver 135 increases the voltage on the gate terminal of control transistor 140 based on the voltage on the source terminal of control transistor 140, keeping control transistor 140 turned on even as the voltage on its source terminal increases in response to the current pulse through load 195A.

FIG. 2 illustrates a schematic of another conventional multi-channel current pulse generator for driving loads with a common terminal. Similar to multi-channel pulse generator 100 shown in FIG. 1, conventional multi-channel pulse generator 200 includes a unique pulse generator 220 for each load 295 shown in the set of loads 290, which share a common terminal at ground 210. The pulse generator 220A for load 295A is configured to charge a bootstrap capacitor 255 based on a load driver control signal CTL 205.

In response to CTL 205 indicating no current pulse is to be generated, pulse control transistor 250 is turned off, and charge control transistor 230 is turned on, which allows the bootstrap capacitor 255 to charge. In response to CTL 205 indicating a current pulse is to be generated, pulse control transistor 250 is turned on, and charge control transistor 230 is turned off. Bootstrap capacitor 255 enables the gate driver 245 to increase the voltage on the gate terminal of pulse control transistor 250 based on the voltage on the source terminal of pulse control transistor 250, keeping pulse control transistor 250 turned on even as the voltage on its source terminal increases in response to the current pulse through load 295A. CTL 205 is provided to gate driver 245 by level shifter 240.

As illustrated by the conventional multi-channel current pulse generators shown in FIGS. 1 and 2, floating gate drivers are more complex, expensive, arid area intensive than ground-referenced drivers. The floating gate drivers must isolate the control signal from the floating gate drive signal or implement some kind of level shifting such as differential signaling to ensure that the rapid change in voltage when the load is driven does not disrupt the control signal. Floating gate drivers also require a means to supply the increased voltage, such as the additional voltage source 130 shown in FIG. 1 or the bootstrap capacitor 255 shown in FIG. 2, further increasing the area, complexity, and component cost of the floating gate driver and, by extension, the multi-channel current pulse generator as a whole.

In addition, as discussed previously herein, some implementations of multi-channel current pulse generators such as in lidar systems must meet particular size and pulse frequency constraints. The increased area required by floating gate drivers makes it difficult to fit a unique floating laser driver for each laser diode in a lidar system close to the array of laser diodes. Moving the laser drivers further away from the laser array increases inductance and decreases laser driver performance, for example increasing the turn-on time, limiting how short a current pulse can be, increasing power consumption, increasing the requires supply voltage, and the like.

SUMMARY OF THE INVENTION

The present invention addresses the disadvantages of floating gate drivers in multi-channel current pulse generators discussed above, by providing a circuit with a single, ground-referenced pulse control transistor. More specifically, the present invention, as described herein, comprises a single pulse control transistor and, for each channel, a load capacitor and a charging control transistor. Each load capacitor is charged by a charging circuit and discharged by providing a current pulse through the corresponding load. Each charging control transistor allows or blocks a charging current for the load capacitor based on a charging control signal. The pulse control transistor preferably comprises a gallium nitride (GaN) field effect transistor (FET) and is chosen to withstand current pulses through the maximum number of loads to be driven simultaneously, M.

In a first embodiment, the present invention includes a unique charging circuit for each channel, which generates the charging current for the corresponding load capacitor. The charging control transistors and the pulse control transistor comprise GaN FETs, with their source terminals are connected to ground. The charging control transistors are chosen to withstand a current pulse through the corresponding load.

In a further embodiment in which the maximum number of loads to be driven simultaneously M is less than the total number of channels, the present invention includes M charging circuits which generate M charging currents. The charging control transistors direct the M charging currents to the appropriate load capacitors and are chosen to withstand the charging current rather than a current pulse through the corresponding load.

The above and other preferred features described herein, including various novel details of implementation and combination of elements, will now be more particularly described with reference to the accompanying drawings and pointed out in the claims. It should be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE PREFERRED EMBODIMENTS

In the following detailed description, reference is made to certain embodiments. These embodiments are described with sufficient detail to enable those skilled in the art to practice them. It is to be understood that other embodiments may be employed and that various structural, logical, and electrical changes may be made. The combinations of features disclosed in the following detailed description may not be necessary to practice the teachings in the broadest sense, and are instead taught merely to describe particularly representative examples of the present teachings.

Figure 1:
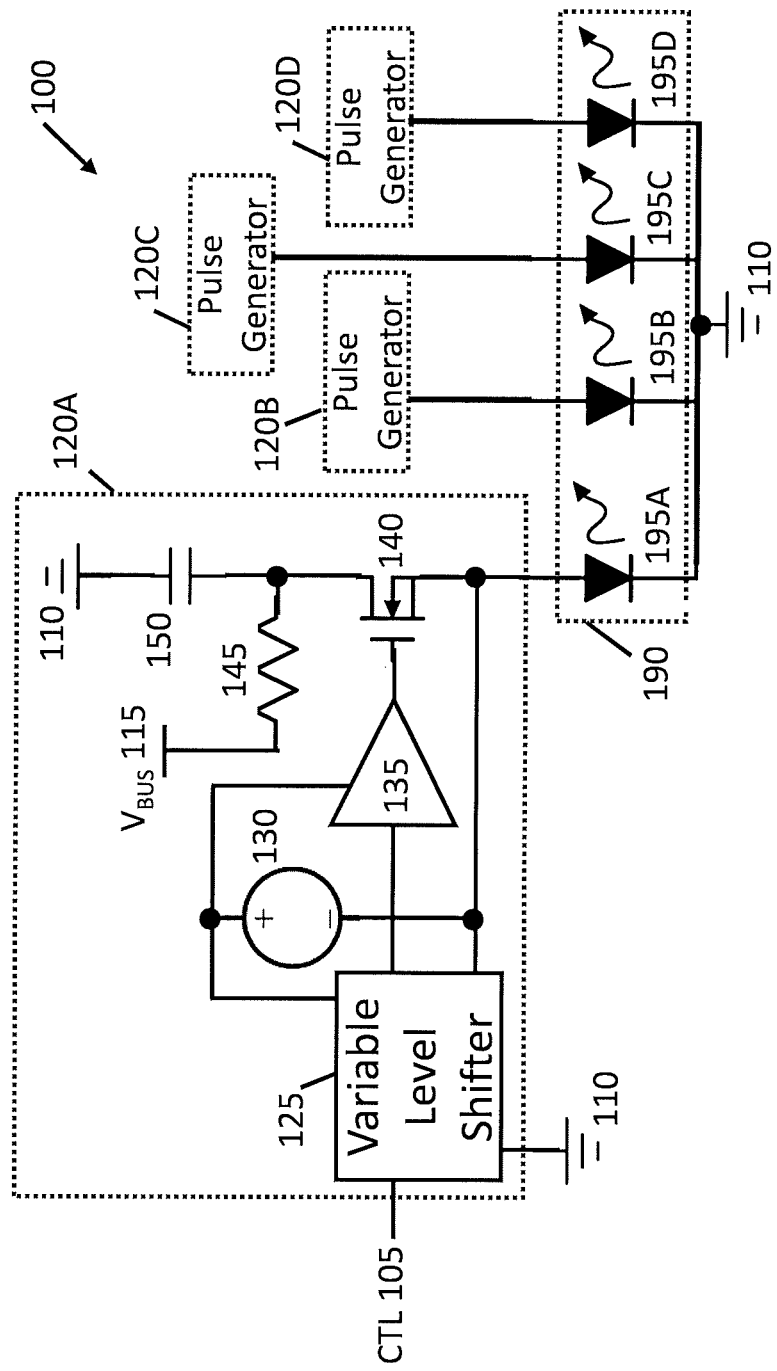
FIG. 1 is a schematic of a conventional multi-channel current pulse generator.
Figure 2:
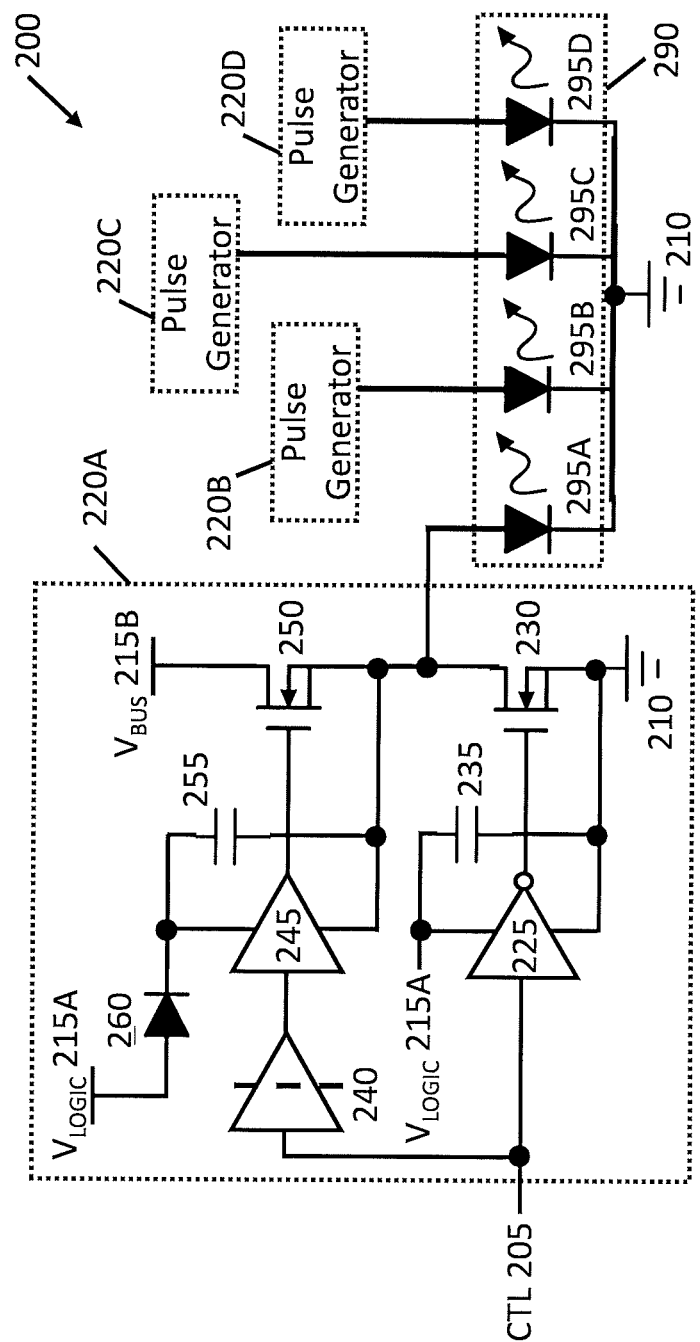
FIG. 2 is a schematic of another conventional multi-channel current pulse generator.
Figure 3:
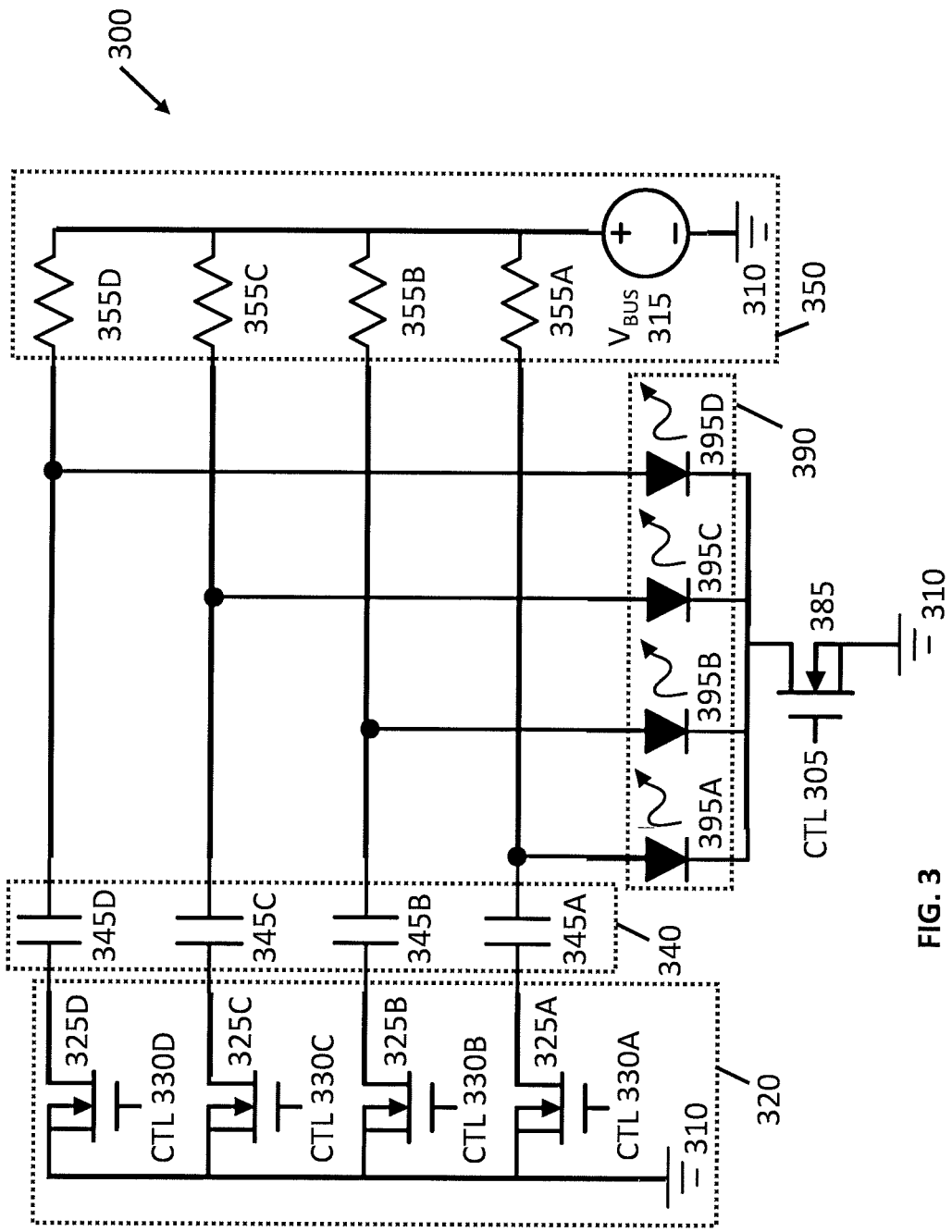
FIG. 3 illustrates a multi-channel current pulse generator according to an exemplary first embodiment of the present invention, incorporating a single pulse control FET and resistive charge circuitry.

FIG. 3 illustrates a multi-channel current pulse generator 300 according to an exemplary first embodiment of the present invention, incorporating a single pulse control FET 385 and resistive charge circuitry. Pulse generator 300 supplies current pulses to the set of loads 390, which in this example includes loads 395A-D. As in FIGS. 1-2, loads 395A-D are depicted as laser diodes, although any appropriate load may be driven. Pulse generator 300 includes a pulse control transistor 385 connected to the common terminal of the set of loads 390 and to ground 310 and configured to receive a load driver control signal CTL 305 which indicates whether any of the loads 395 in the set of loads 390 are to be driven or not. In response to CTL 305 indicating none of the loads 395 in the set of loads 390 are to be driven, pulse control transistor 385 turns off and acts as an open switch, preventing the flow of current through the set of loads 390.

While no current flows through the set of loads 290, the set of charging control transistors 320 cause the resistive charging circuit 350 to charge the set of capacitors 340. The resistive charging circuit 350, the set of capacitors 340, and the set of charging control transistors 320 include a unique resistor 355, a unique capacitor 345, and a unique charging control transistor 325 respectively for each load 395 in the set of loads 390. Each resistor 355 may have a different resistance value to set a unique charging current for the corresponding capacitor 345. Different resistance values and different charging currents store different amounts of energy on the corresponding capacitors 345, which enables the magnitude of current pulses drawn from the different capacitors 345 to be different as well and allows finer control over the magnitude of the current pulse compared to a resistive charging circuit in which all the resistors have a same resistance value.

Each charging control transistor 325 receives a unique charging control signal CTL 330 indicative of whether the corresponding capacitor 345 should be charged in preparation for the corresponding load 395 to be driven in the next pulse. For example, if CTL 330A indicates that laser diode 395A should emit light in the next pulse, charging control transistor 325A turns on and acts as a closed switch, causing current through resistor 355A to charge capacitor 345A. If, at the same time, CTL 330B indicates that laser diode 395B should not emit light in the next pulse, charging control transistor 325B is off and acts as an open switch, which prevents current through resistor 355B from charging capacitor 345B.

In response to CTL 305 indicating that at least laser diode 395A is to be driven and to emit light, pulse control transistor 385 acts as a closed switch, causing a pulse current to be drawn from the energy stored on capacitor 345A and flow through laser diode 395A and pulse control transistor 385. Because capacitor 345B is not charged, no pulse current is drawn from it through laser diode 395B. Thus, each load 395 in the set of loads 390 can be controlled independently despite pulse generator 300 including only a single pulse control transistor 385. Charging control transistors 325A-D and pulse control transistor 385 are preferably enhancement mode GaN FET semiconductor devices, which are monolithically integrated with their respective gate drivers, not shown, onto a single semiconductor die. Charging control transistors 325A-D and pulse control transistor 385 are ground-referenced, eliminating the need for floating gate drivers and reducing the complexity, area, and cost of pulse generator 300 compared to the pulse generators 100 and 200 shown in FIGS. 1 and 2.

The size of pulse control transistor 385 is chosen to withstand the combined current pulses of the maximum number of channels expected to be driven simultaneously. For example, in an implementation in which all of laser diodes 395A-D are to be fired at the same time, pulse control transistor 385 must withstand four times the current of a single current pulse. In an implementation in which only two of laser diodes 395A-D are to be fired at any given time, pulse control transistor 385 must withstand only twice the current of a single current pulse. Each charging control transistor 325 must withstand the current of only a single current pulse, from its corresponding load 395. The size of the charging control transistors 325A-D can be chosen accordingly, or each of the charging control transistors 325A-D can be placed in parallel with a separate large diode, allowing the charging control transistors 325A-D to be smaller.

The turn-on and turn-off time of pulse control transistor 385 is more important than the turn-on and turn-off speeds of charging control transistors 325A-D, as pulse control transistor 385 controls the duration and shape of current pulses through the set of loads 390 over a very short period of time compared to the much longer charging period during which charging control transistors 325A-D cause the set of capacitors 340 to be charged.

Figure 4:
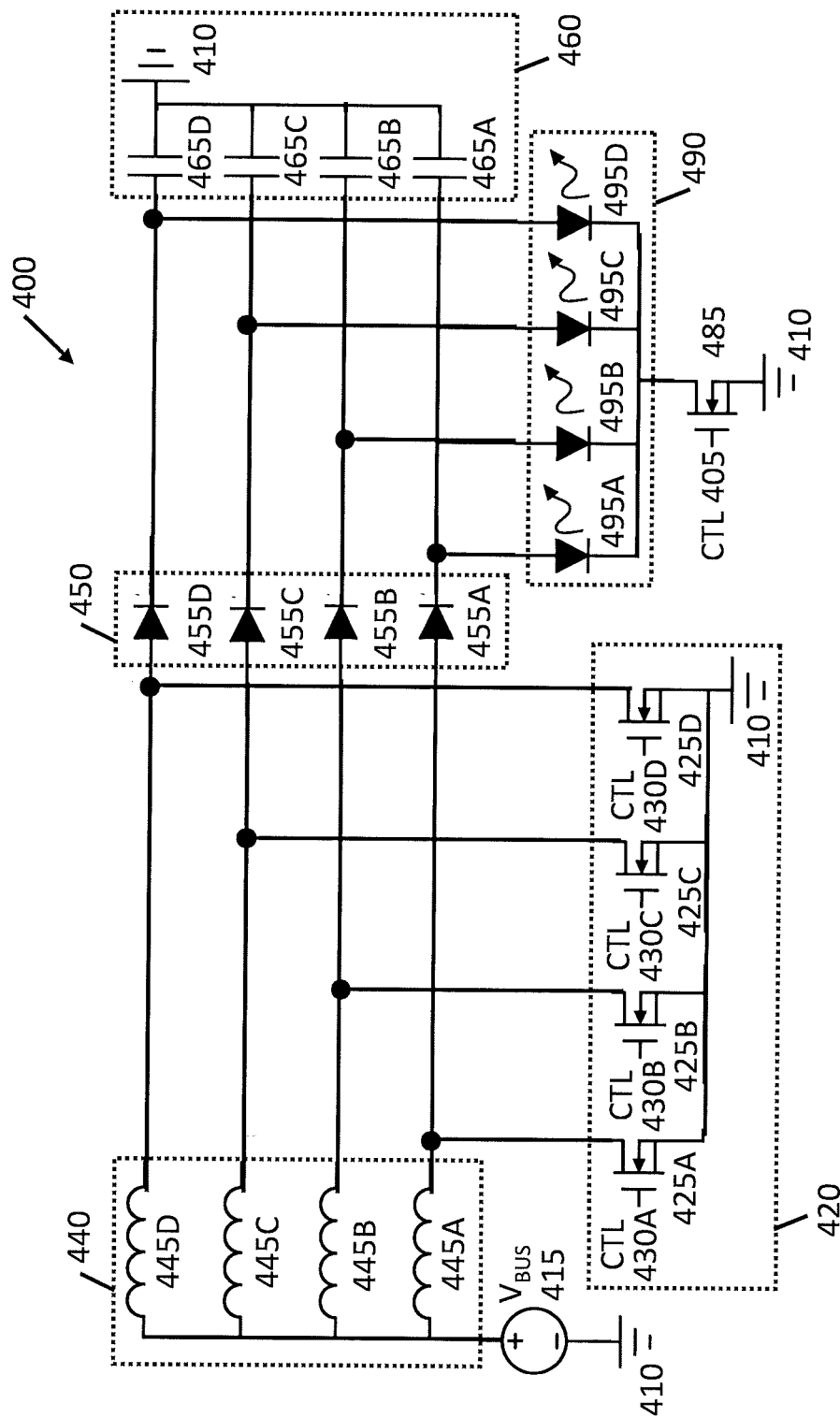
FIG. 4 illustrates a multi-channel current pulse generator according to the first embodiment of the present invention, incorporating a single pulse control FET and a first type of boost charge circuitry.

FIG. 4 illustrates a multi-channel current pulse generator 400 according to the first embodiment of the present invention shown in FIG. 3, but with a different type of boost charging circuitry. Similar to pulse generator 300 shown in FIG. 3, pulse generator 400 includes a set of charging control transistors 420 and a set of capacitors 460, which include a unique charging control transistor 425 and a unique capacitor 465, respectively, for each load 495 in the set of loads 490. The loads 495 share a common terminal connected to pulse control transistor 485. In contrast to pulse generator 300 though, pulse generator 400 also includes a set of inductors 440 and a set of diodes 450, which include a unique inductor 445 and a unique diode 455, respectively, for each load 495 as well.

The set of charging control transistors 420, the set of inductors 440, and the set of capacitors 460 implement a boost charging circuit in which energy stored in an inductor 445 while the corresponding charging control transistor 425 is turned on is transferred to the corresponding capacitor 465 in response to the charging control transistor 425 being turned off. Each inductor 445 can have a different inductance value to set a unique amount of energy stored in the inductor 445 and, by extension, the corresponding capacitor 465. The set of diodes 450 are connected between the set of inductors 440 and the set of charging control transistors 420 on one side, and the set of capacitors 460 and the set of loads 490 on the other side, such that a capacitor 465 in the set of capacitors 460 is not completely discharged while the corresponding charging control transistor 425 is turned on and acts as a closed switch.

Similar to the operation of the circuit of FIG. 3, in response to load driver control signal CTL 405 indicating at least one load 495 is to be driven, pulse control transistor 485 acts as a closed switch, causing a pulse current to be drawn from the energy stored on the corresponding capacitor 465A and to flow through the load 495 and pulse control transistor 485.

Figure 5:
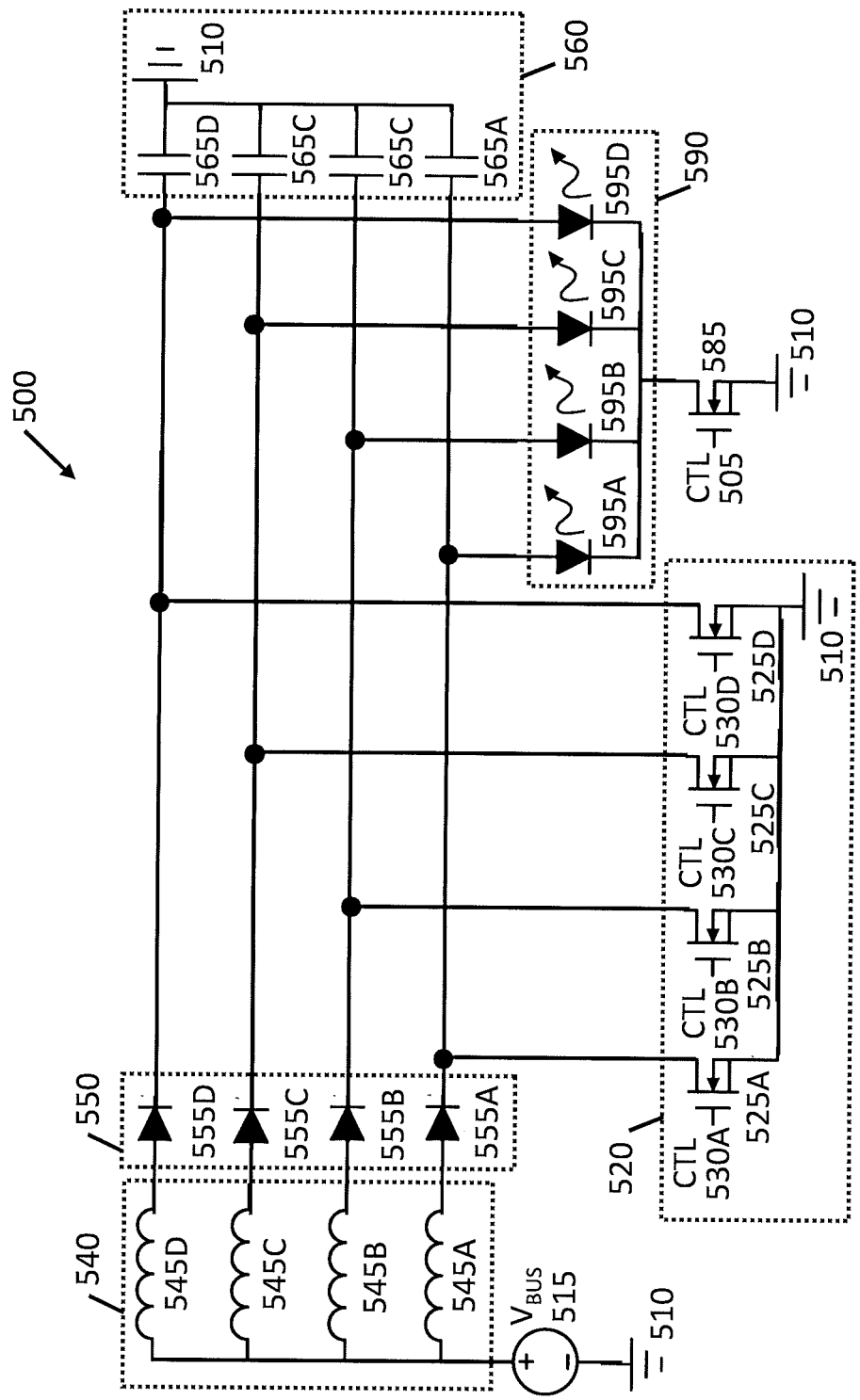
FIG. 5 illustrates a multi-channel current pulse generator according to the first embodiment of the present invention, incorporating a single pulse control FET and a second type of boost charge circuitry.

FIG. 5 illustrates a multi-channel current pulse generator 500 according to the first embodiment of the present invention as shown in FIGS. 3 and 4, but incorporating yet another type of boost charging circuitry. Similar to pulse generator 400 shown in FIG. 4, pulse generator 500 includes a set of charging control transistors 530, a set of inductors 540, a set of diodes 550, and a set of capacitors 560, which include a unique charging control transistor 525, a unique inductor 545, a unique diode 550, and a unique capacitor 565, respectively, for each load 595 in the set of loads 590. The loads 595 share a common terminal connected to pulse control transistor 585. The set of charging control transistors 520, the set of inductors 540, and the set of capacitors 560 implement a boost charging circuit, similar to pulse generator 400.

In the charging circuit of FIG. 5, the set of diodes 550 are connected between the set of inductors 540 on one side, and the set of charging control transistors 520, the set of capacitors 560, and the set of loads 590 on the other side, such that a capacitor 565 in the set of capacitors 560 is discharged while the corresponding charging control transistor 525 is turned on and acts as a closed switch, ensuring each capacitor 565 in the set of capacitors 560 is charged from a same initial condition.

Any appropriate ground-referenced charging circuitry in which energy is stored in a capacitor may be used in the place of the resistive charging circuitry in pulse generator 300, the boost charging circuitry in pulse generator 400, or the boost charging circuitry in pulse generator 500. Similarly, any number of channels may be implemented in multi-channel pulse generators according to the first embodiment of the present invention, which can be used to drive any kind of multi-channel load with a shared low potential terminal.

Multi-channel pulse generators according to the first embodiment of the present invention are capable of controlling the pulse energy for each channel individually. The charging control transistors, the pulse control transistor, gate drivers for the charging control transistors and the pulse control transistor, and other charging circuitry components may be monolithically integrated onto a single semiconductor die. In implementations in which the maximum number of channels to be discharged simultaneously M is less than the total number of channels in the multi-channel pulse generators, the size of the pulse control transistor may be chosen to withstand only M times a single current pulse, rather than the total current of all current pulses, and the total area of the semiconductor die occupied by transistors may be reduced.

Multi-channel pulse generators according to the first embodiment of the present invention include a unique charging circuit for each channel. However, when the maximum number of channels to be discharged simultaneously M is less than the total number of channels, the area and cost of the multi-channel pulse generator can be further reduced by incorporating charge steering circuits to direct the M charging currents from the M charging circuits to charge the appropriate capacitors. The M charging circuits are reused, and charge load capacitors associated with multiple channels, not just one single load capacitor.

Figure 6:
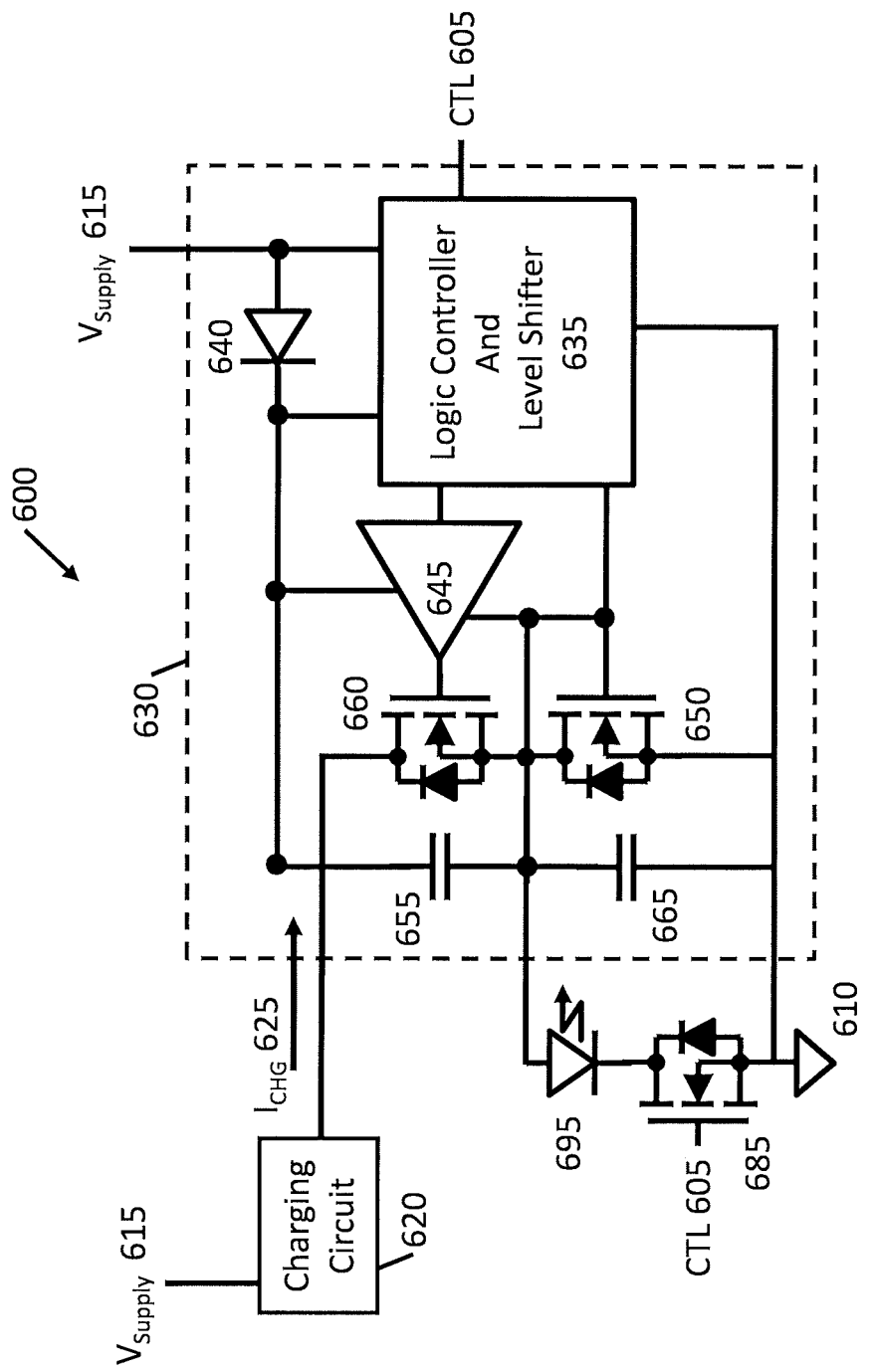
FIG. 6 illustrates a current pulse generator according to an exemplary second embodiment of the present invention, incorporating a charge steering circuit.

FIG. 6 illustrates a current pulse generator 600 according to an exemplary second embodiment of the present invention, incorporating a charge steering circuit 630. Pulse generator 600 drives a single load 695 and includes a single charge steering circuit 630 for ease of illustration. A multi-channel pulse generator capable of driving multiple channels and including multiple charge steering circuits is described further herein, with reference to FIG. 7.

Pulse generator 600 includes a charging circuit 620, the charge steering circuit 630, and pulse control transistor 685. Charging circuit 620 may be any appropriate charging circuit, such as the resistive charging circuit in pulse generator 300 or the boost charging circuits in pulse generators 400 and 500. Charge steering circuit 630 includes a logic controller and level shifter 635, a diode 640, a gate driver 645, a bootstrap control transistor 650, a bootstrap capacitor 655, a charging control transistor 660, and a load capacitor 665. In some embodiments, charging control transistor 660 is a p-type transistor, in which case the bootstrap capacitor 655 and bootstrap control transistor 650 may be omitted. The logic controller and level shifter 635 receives the control signal 605, which is indicative of whether the load 695 is to be driven in the next pulse, and outputs a control signal indicative of whether the load capacitor 665 is to be charged such that the load 695 may be driven in the next pulse. Gate driver 645 and bootstrap control transistor 650 receive the control signal from the logic controller and level shifter 635.

In response to the control signal from logic controller and level shifter 635 indicating the load capacitor 665 does not need to be charged, gate driver 645 causes charging control transistor 660 to turn off and act as an open switch, which disconnects load capacitor 665 from the charging current $I_{CHG}$ 625. Bootstrap control transistor 650 turns on and acts as a closed switch, which causes bootstrap capacitor 655 to be charged from the supply voltage source 615 through diode 640. In response to the control signal from logic controller and level shifter 635 indicating the load capacitor 665 needs to be charged, bootstrap control transistor 650 turns off and acts as an open switch, which stops bootstrap capacitor 655 from charging. Charging control transistor 660 turns on and acts as a closed switch, which causes the charging current $I_{CHG}$ 625 to flow through charging control transistor 660 to charge load capacitor 665.

When load capacitor 665 is charged to the appropriate voltage, charging control transistor 660 can be turned off. The bootstrap control transistor 650 remains off as well, and load capacitor 665 holds its charge until load driver control signal CTL 605 indicates load 695 is to be driven and a current pulse drawn from the stored energy. In some embodiments, the charging circuit 620 may be turned off when load capacitor 665 is charged to the appropriate voltage to reduce power consumption. In embodiments where the charging circuit 620 comprises a resistive charging circuit, charging control transistor 660 can be left on, and the supply voltage $V_{SUPPLY}$ from supply voltage source 615 determines the voltage across load capacitor 665.

Figure 7:
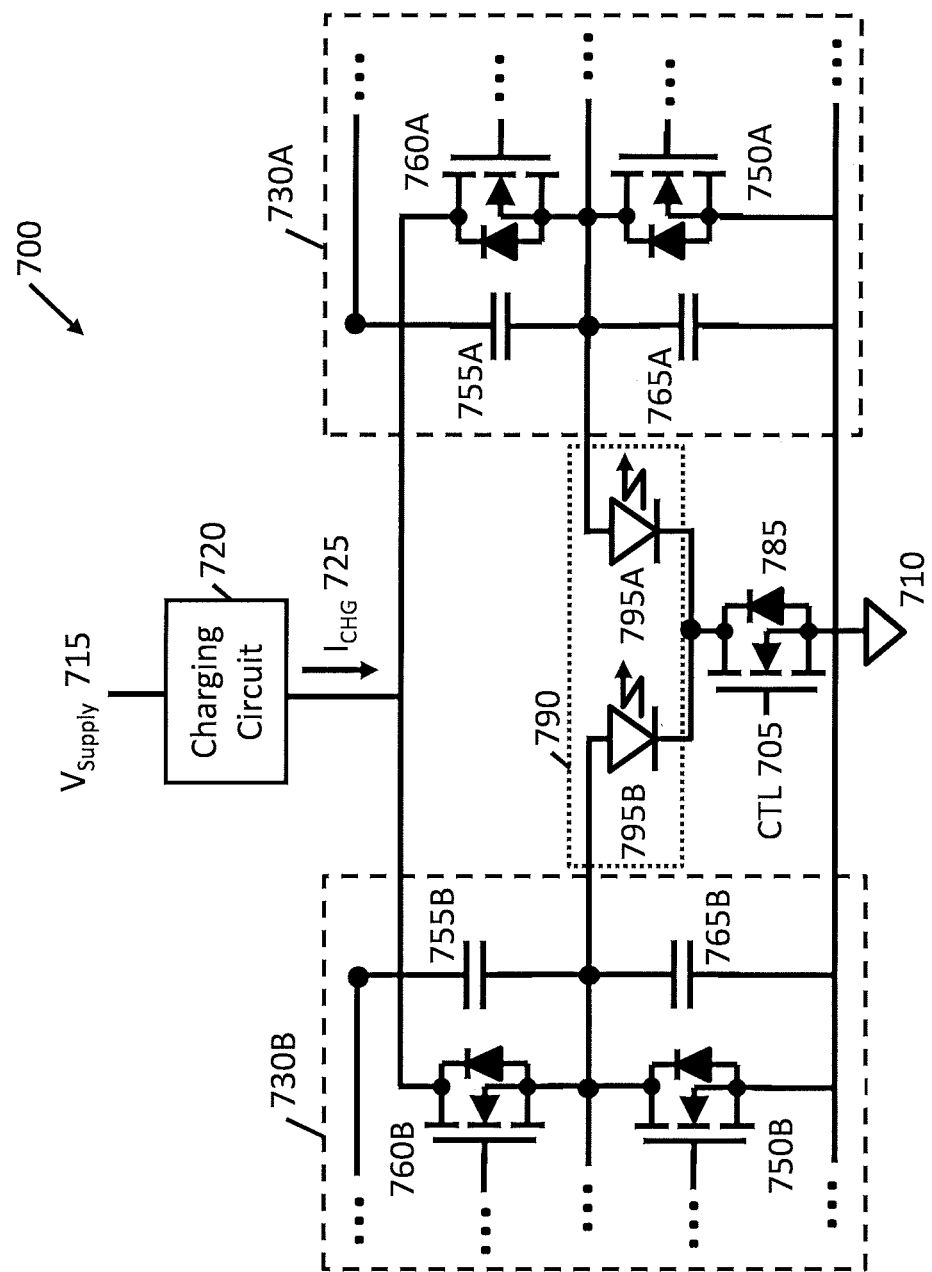
FIG. 7 illustrates a multi-channel current pulse generator according to the second embodiment of the present invention, incorporating a single pulse control FET, a single charging circuit, and multiple charge steering circuits.

FIG. 7 illustrates a multi-channel current pulse generator 700 according to the second embodiment of the present invention, incorporating a single pulse control FET 785, a single charging circuit 720, and two charge steering circuits 730A and 730B. Only one of loads 795A-B is driven at a time, so the single charging circuit 720 alternately charges load capacitor 765A for load 795A and load capacitor 765B for load 795B, conserving space on the semiconductor die by reusing the same charging circuit 720 for both rather than including a unique charging circuit for each channel. Charge steering circuits 730A and 730B are substantially the same as charge steering circuit 630 in pulse generator 600, and are shown in part in FIG. 7 for ease of illustration. Charging circuit 720 may be any appropriate charging circuit, such as the resistive charging circuit in pulse generator 300 or the boost charging circuits in pulse generators 400 and 500.

In response to load driver control signal CTL 705 indicating that load 795B and not load 795A is to be driven in the next pulse, charging control transistor 760A turns off and acts as an open switch, while charging control transistor 760B turns on and acts as a closed switch. The charging current $I_{CHG}$ 725 from charging circuit 720 is prevented from charging load capacitor 765A by the open switch of charging control transistor 760A and instead charges load capacitor 765B through charging control transistor 760B. In response to CTL 705 indicating that load 795B and not load 795A is to be driven, i.e., that pulse generator 700 should generate a current pulse, pulse control transistor 785 turns on and acts as a closed switch, attempting to draw a current pulse from both load capacitors 765A-B.

Because only load capacitor 765B is charged, a current pulse is only drawn from load capacitor 765B to drive load 795B. Load 795A remains off. In a lidar system, for example, the uncharged load capacitor 765A prevents laser diode 795A from emitting light, reducing the total light emission and power consumption of the lidar system and helping the lidar system comply with any maximum light emission constraints imposed for eye safety and the like.

Bootstrap control transistors 750A-B and charging control transistors 760A-B are not in the current path of the higher load driving current pulse and are chosen to withstand the charging current $I_{CHG}$ 725, conserving space on the semiconductor die compared to pulse generators according to the first embodiment of the present invention. Only load capacitors 765A-B, loads 795A-B, and pulse control transistor 785 experience the higher load driving current pulse. Pulse control transistor 785 experiences M load driving current pulses at any given time, not the number of channels, and is sized accordingly.

Any number of channels may be incorporated to operate from a single charging circuit based on the maximum number of channels to be driven simultaneously, M, and the total number of channels. For example, a multi-channel pulse generator drives eight loads in total, but only drives two loads at a time. The multi-channel pulse generator may include eight charge steering circuits and a single charging circuit for the eight channels. The single charging circuit may generate a charging current two times the magnitude of a charging current for a single load capacitor, which the eight charge steering circuits direct to the appropriate load capacitors based on an external control signal provided to the multi-channel pulse generator. Alternatively, in response to the time period between current pulses being long enough to charge multiple load capacitors sequentially rather than simultaneously, the single charging circuit may generate a charging current the same magnitude as a charging current for a single load capacitor, which the eight charge steering circuits use to charge the appropriate load capacitors sequentially.

The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings.

What is claimed is:

1. A multi-channel current pulse generator for driving a plurality of loads, each of the loads having a unique positive terminal and a common negative terminal electrically shared by the plurality of loads, the current pulse generator comprising:
   a single pulse control transistor for allowing or blocking current pulses through each of the plurality of loads based on a load driver control signal and having a drain terminal connected to the common negative terminal of the loads, a source terminal connected to ground, and a gate terminal for receiving the load driver control signal; and
   each load of the plurality of loads has associated therewith:
      a load capacitor configured to be charged by a charging circuit and discharged by providing a current pulse to the positive terminal of the respective associated load; and
      a charging control transistor for allowing or blocking a charging current to the load capacitor from the charging circuit based on a corresponding charging control signal.

2. The multi-channel current pulse generator of claim 1, wherein the pulse control transistor comprises a gallium nitride (GaN) field effect transistor (FET).

3. The multi-channel current pulse generator of claim 2, wherein the pulse control transistor comprises an enhancement mode GaN FET.

4. The multi-channel current pulse generator of claim 1, wherein the charging circuit comprises a resistive charging circuit.

5. The multi-channel current pulse generator of claim 1, wherein the charging circuit comprises a boost charging circuit comprising an inductor and a diode.

6. The multi-channel current pulse generator of claim 1, wherein, for each load of the plurality of loads, the multi-channel current pulse generator comprises a unique charging circuit for generating the charging current to the respective load capacitor.

7. The multi-channel current pulse generator of claim 6, wherein the unique charging circuits for the plurality of loads are configured to generate different charging currents in accordance with the respective load.

8. The multi-channel current pulse generator of claim 1, wherein the charging control transistors are chosen to withstand a current pulse through the corresponding load.

9. The multi-channel current pulse generator of claim 1, wherein the pulse control transistor is chosen to withstand current pulses through the plurality of loads.

10. The multi-channel current pulse generator of claim 1, wherein the charging control transistors comprise GaN FETs.

11. The multi-channel current pulse generator of claim 10, wherein the charging control transistors comprise enhancement mode GaN FETs.

12. The multi-channel current pulse generator of claim 1, wherein a maximum number of loads to be driven simultaneously M is less than the plurality of loads, and wherein the multi-channel current pulse generator comprises M charging circuits for generating M charging currents.

13. The multi-channel current pulse generator of claim 12, wherein at least one of the M charging circuits comprises a resistive charging circuit.

14. The multi-channel current pulse generator of claim 12, wherein at least one of the M charging circuits comprises a boost charging circuit.

15. The multi-channel current pulse generator of claim 12, wherein the pulse control transistor is chosen to withstand M current pulses through M loads.

16. The multi-channel current pulse generator of claim 12, wherein the charging control transistors comprise GaN FETs, and wherein, for each load of the plurality of loads, the multi-channel current pulse generator comprises:
   a bootstrap capacitor for providing additional voltage to the gate terminal of the charging control transistor; and
   a bootstrap control transistor for allowing or blocking a bootstrap charging current for the bootstrap capacitor based on a bootstrap control signal,
   wherein the bootstrap control transistor and the charging control transistor are not on at the same time.

17. The multi-channel current pulse generator of claim 16, wherein the charging control transistors comprise enhancement mode GaN FETs.

* * * * *